United States Patent [19]

Keller et al.

[11] 4,266,467
[45] May 12, 1981

[54] DIFFERENTIAL PRESSURE LIMITING VALVE

[75] Inventors: Guenter Keller, Modautal; Andreas Pohl, Pfungstadt; Gerhard Hintz, Ober-Ramstadt, all of Fed. Rep. of Germany

[73] Assignee: Carl Schenck AG, Darmstadt, Fed. Rep. of Germany

[21] Appl. No.: 951,721

[22] Filed: Oct. 16, 1978

[30] Foreign Application Priority Data

Oct. 27, 1977 [DE] Fed. Rep. of Germany ....... 2748107

[51] Int. Cl.$^3$ ............................................ F15B 13/042
[52] U.S. Cl. .................................. 91/437; 137/493.8; 137/528
[58] Field of Search .................. 91/437, 438; 137/529, 137/528, 533.25, 542, 493.8

[56] References Cited

U.S. PATENT DOCUMENTS

| | | | |
|---|---|---|---|
| 170,974 | 12/1875 | Westwater | 137/533.25 X |
| 2,727,532 | 12/1955 | Sousa et al. | 137/528 |
| 2,926,634 | 3/1960 | Falendysz et al. | 91/437 X |
| 2,943,639 | 7/1960 | Smith | 137/533.25 X |
| 3,122,064 | 2/1964 | Douglas | 91/437 |
| 3,636,969 | 1/1972 | Jacobellis | 137/528 X |
| 4,091,838 | 5/1978 | Dowty | 137/528 |

FOREIGN PATENT DOCUMENTS

517643 2/1931 Fed. Rep. of Germany ...... 137/533.25
702875 1/1954 United Kingdom ................... 137/542

*Primary Examiner*—Irwin C. Cohen
*Attorney, Agent, or Firm*—W. G. Fasse; D. F. Gould

[57] ABSTRACT

The present differential pressure limiting valve is constructed with an axially movable valve body having hydrostatic bearings including bearing shafts, whereby the bearing shafts are connected to opposite sides of said valve body in axial alignment. Normally the valve body is biased against the valve seat by an adjustable closing spring acting on the bearing shaft or valve body opposite the valve seat to close the valve. In addition, the face end of the bearing shaft opposite the valve seat may be loaded by a pressure medium. The respective diameters of the bearings may differ. However, the effective cross-sections of the valve body are preferably equal on both sides of the valve seat. The present unidirectionally effective valves are especially suitable for use in a parallel circuit, wherein one valve is effective for pressure relief in one flow direction whereas the parallel valve is effective for pressure relief in the opposite flow direction, whereby pressure relief may be provided, for example, for both chambers of a dual acting piston drive cylinder arrangement.

11 Claims, 4 Drawing Figures

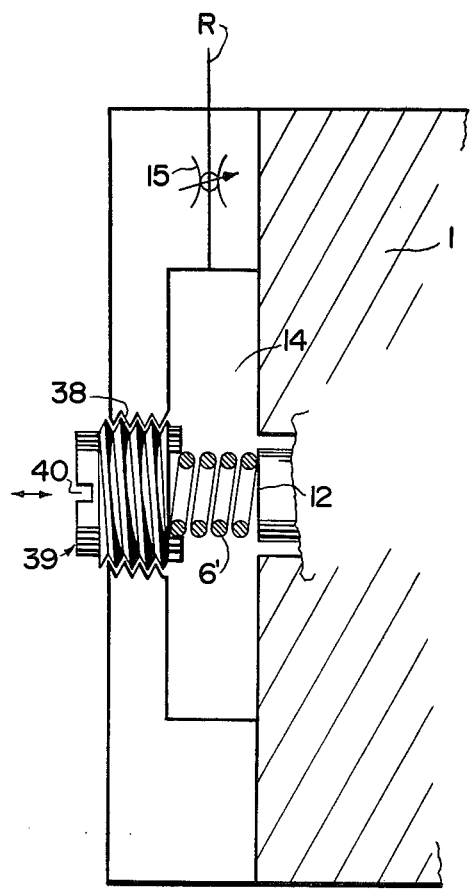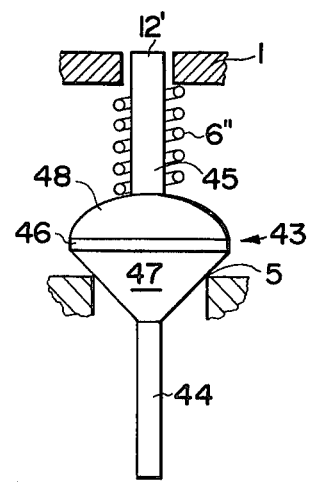

DIFFERENTIAL PRESSURE LIMITING VALVE

BACKGROUND OF THE INVENTION

This invention relates to a differential pressure limiting valve with a valve casing defining a valve cavity and port means for a pressure medium. The valve casing has bearing bores and a valve seat. A cone shaped valve body cooperates with the valve seat and is axially slideable in the cavity of the valve casing.

Pressure limiting valves such as pressure relief valves, safety valves, cut-off valves, etc. are valves which open an exit cross sectional passage when a specified pressure is exceeded thereby preventing that the pressure, particularly in a hydraulic system, exceeds a pedetermined highest value. Differential pressure limiting valves are supposed to limit a pressure difference, for example, between the chambers of a piston drive cylinder.

Known types of differential pressure relief valves have not satisfactorily solved the problem of limiting the differential pressure to a value of zero. Particularly valves with a large flow volume have not satisfactorily solved this problem since the valve surfaces of the employed valves are not equal. The reason for this, among others, is attributable to the fact that for differential pressure limiting a preliminary controlling stage and a main controlling stage are required. Even the preliminary controlling stage itself requires a differential pressure for its actuation. Throttling devices in the main controlling stage produce an additional differential pressure so that undesired response differential pressures necessarily result. When such differential pressure limiting valves are used, for example, on the loading cylinders of testing equipment, turn-on impulses may occur at the specimens being tested which either damage the specimen or affect the test result.

OBJECTS OF THE INVENTION

In view of the above it is the aim of the invention to achieve the following objects singly or in combination:
   to provide a differential pressure limiting valve capable of limiting differential pressures to zero or to a value near zero and which also permits maintaining or adjusting large differential pressures up to 300 bar;
   to provide a valve with a substantially unidirectional flow characteristic suitable for passing large flow quantities and which is also suitable for connection in parallel with a valve of identical construction but oppositely connected so that the flow control may be effective in both flow directions;
   to provide such a valve which also has a high response sensitivity; and
   to provide such a valve which has a wide differential pressure adjustment range from substantially zero on up.

SUMMARY OF THE INVENTION

According to the invention there is provided a differential pressure relief valve wherein the valve body has a bearing shaft attached to opposite sides to be axially movable within bearing bores inside of a valve casing. The face of the bearing shaft opposite the valve seat is loadable by a pressure medium for adjusting the response characteristic of the valve.

An advantageous embodiment of the invention is seen in that the bearing shafts of the valve body are hydrostatically supported. Hydrostatic bearings lessen the frictional forces during axial movement of the valve body, whereby a particularly good adjustment sensitivity results. If the diameter of each bearing shaft is slightly different relative to the diameter of the other shaft and if the diameters are so chosen, that the effective cross-sectional surfaces of the valve body are the same on both sides of the valve seat, it is possible to limit the adjustable differential pressure practically to the value of zero by means of the present valves.

According to a further embodiment of the invention, a valve closing spring is arranged between the valve body and the valve casing, whereby the position of the valve body within the valve casing is normally fixed in the closed state. If the closing spring is adjustable in its biasing force, it is possible to adjust the differential pressure by means of the valve closing spring.

A further embodiment of the invention comprises an arrangement for limiting the differential pressure of dual acting working cylinders or load applying cylinders using two differential pressure limiting valves according to the invention connected in parallel to each other whereby one valve is effective in a flow direction opposite to the flow direction through the other valve. Thus, the differential pressure in both chambers of a loading cylinder e.g., the loading cylinder of a test apparatus may be limited or adjusted. In this manner, undesired tensile loads as well as pressure loads on the test specimen are avoided.

BRIEF FIGURE DESCRIPTION

In order that the invention may be clearly understood, it will now be described by way of example, with reference to the accompanying drawings, wherein:

FIG. 3 shows an adjustable closing spring for applying pressure or a biasing force to the valve body through the bearing shaft opposite the valve seat thereby biasing the valve body against the valve seat; and FIG. 4 shows a valve body with different diameter bearing shafts and a biasing spring.

DETAILED DESCRIPTION OF PREFERRED EXAMPLE EMBODIMENTS

Figure 1:
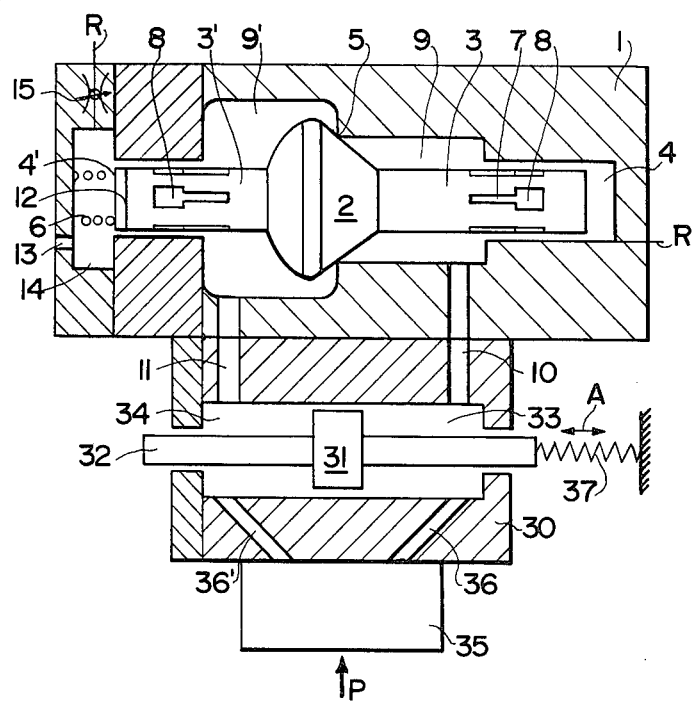
FIG. 1 is an axial sectional view of a differential pressure limiting valve for a hydraulic loading cylinder.

The differential pressure limiting valve shown in FIG. 1 has a valve casing 1 and a cone shaped valve body 2 with bearing shafts 3, 3'. The bearing shafts 3, 3' are situated in bearing bores 4, 4' of the valve casing 1.

Normally, in the closed position, the valve body 2 rests against a valve seat 5 of the valve casing 1. The valve body 2 may be biased in the closed position by a closing spring 6 as shown when there is no load on the valve.

The bearing shafts 3, 3' in the bores 4, 4' are constructed as hydrostatic bearings. The pressure medium for the bearings is supplied from the interior cavity which has two chambers or portions 9, 9' in the valve casing. For this purpose channels 7 supply the pressure medium to the bearing pocket 8. Thus, the pressure medium reaches the bearing supports proper from these pockets.

The valve casing has supply bores 10, 11 through which the interior chambers 9, 9' of the valve casing are connected to the hydraulic system to be protected, for example, a load applying piston cylinder.

FIG. 1 shows a hydraulic load applying cylinder 30 with a piston 31 and a piston rod 32. Both cylinder chambers 33, 34 of the load applying cylinder 30 are supplied with a pressure medium from a pressure medium source shown symbolically at P, by means of a servo-valve 35. The pressure in the cylinder chambers 33, 34 of the load applying cylinder 30 is controlled by the servo-valve 35. Tensile forces, pressure forces or alternating loads may be applied to the schematically represented test specimen 37 by means of the piston 31 and the piston rod 32 as shown by the double arrow A when a corresponding pressure is present in the cylinder chambers 33, 34.

When the hydraulic system is turned on, a pressure difference may occur in the cylinder chambers 33, 34 of the load applying cylinder 30, for example, due to an origin distortion of the servo-valve 35. Such a pressure difference may, as a result of the high system pressure, cause an undesired loading stroke on the test specimen 37. Such a loading is avoided by connecting a differential pressure limiting valve as shown in FIG. 1.

To avoid turn-on impulses, the valve body 2 of the valve 1 is biased against the valve seat 5 by a force as small as possible, for example, merely by the force of the closing spring 6. Hence, if a higher pressure develops in the cylinder chamber 33 of the loading cylinder 30 than in the cylinder chamber 34, the resulting differential pressure also acts upon the valve body 2 through the supply conduit 10 and through the inner chamber 9 of the valve casing 1. Thus, the valve body 2 is lifted from the valve seat 5 and short circuits both cylinder chambers 33, 34 through the inner chambers 9' and 9 and the supply conduits 10 and 11. In this manner a pressure differential may not build up in the cylinder chambers and hence no force may be exerted on the piston rod or the test specimen. The use of hydrostatic bearings 7,8 on the bearing shafts 3, 3', increases the response sensitivity of the differential pressure limiting valve body 2. Hydrostatic bearings as such are known to one skilled in the art, so that a further description appears unnecessary.

When a higher pressure develops in the cylinder chamber 34 than in the chamber 33, the arrangement shown in FIG. 1 is ineffective, because in this instance the valve body 2 will be biased additionally against the valve seat by a force resulting from the pressure differential between the cylinder chambers 33, 34 or between the interior chambers 9, 9'.

Figure 2:
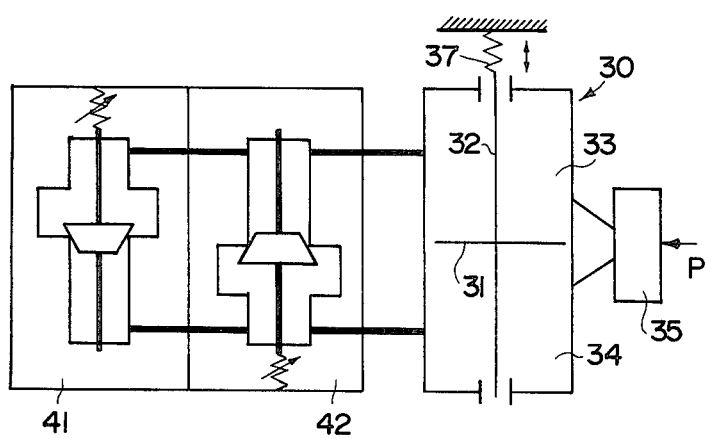
FIG. 2 is a block diagram of an arrangement for limiting differential pressure by means of two differential pressure limiting valves connected in parallel and effective in opposing flow directions.

FIG. 2 illustrates a hydraulic circuit diagram wherein two valves 41 and 42 according to the invention are connected in parallel to each other but in an opposite flow passing sense whereby the problem mentioned in the foregoing paragraph is avoided. Both parallel connected differential pressure valves 41, 42 are connected to the double acting piston cylinder 30 and operate in opposing directions whereby any turn-on impulse loads that could otherwise be applied to the specimen 37, which is connected to the piston rod 32 of the piston 30, are avoided in the push and pull directions.

An arrangement similar to that shown in FIG. 2, however using prior art valves would prevent that forces are applied to the test specimen 37 by the piston cylinder 30 if the valves were not disconnected again by special stopping devices after the system pressure has been turned on. The valves of the present invention have the advantage that such stopping devices are not required.

As shown in FIG. 1 the face area 12 of the bearing shaft 3' may be additionally loaded through the supply conduit 13 by pressure media such as hydraulic or pneumatic pressure media. In that way a preloading or biasing may be applied to the valve body 2, which biasing has the effect that the valve opens only in response to a specific pressure difference between the cylinder chambers 33, 34 of the load applying piston cylinder 30 or between the interior spaces 9, 9' of the valve. The controlling pressure in the chamber 14 may, for example, be adjusted by a regulating means 15 such as an adjustable throttle or the like.

The desired pressure differential may be adjusted within a very wide range substantially from zero on up by the appropriate selection of the facing surface area 12 of the bearing shaft 3' relative to the effective cross-sectional surface area of the valve body 2. The valve may thus be used, for example, as an overload protection device for the test specimen 37 or for the piston cylinder 30.

Where small pressure differentials are involved the adjustable closing or biasing spring 6 may be used for the pressure adjustment. FIG. 3 shows a possibility for adjusting the biasing force of the spring 6' by tightening or loosening the threaded spring adjustment 39 in the tapped hole 38 of the valve body 1, for example, by a screwdriver inserted in a slot 40. At the locations R, leakage return lines may be provided in the valve body 1 for any oil leaking into the end of the bore 4 or into the chamber 14 as shown in FIG. 1.

Incidentally, FIG. 4 shows a valve plug 43 with a bearing shaft 44 of larger diameter than the bearing shaft 45. As mentioned above, by properly correlating the facing surface area 12' of the bearing shaft 45 to the effective surface areas of the valve body 46 proper, the biasing of the valve body 46 against the seat 5 may be determined and hence the response characteristic of the valve selected in accordance with particular requirements. As in FIG. 1, the valve plug of FIG. 4 has a conical portion 47 and a rounded surface portion 48, whereby the flow characteristics of the valve are favorably influenced especially with regard to a smooth flow.

FIG. 4 also shows a modified arrangement of the spring 6" around the shaft 45 whereby the spring 6" bears against the valve casing 1 and against the valve body surface 48 thereby biasing the valve body 46 into the closed position against the valve seat as described above with reference to springs 6 and 6'.

The various functions of the differential pressure limiting valve of the invention may be determined or adjusted by hand or electrically. The same valve may hence be used for different purposes in the manner described. In connection with piston cylinders, for example, the valve may be used for the prevention of turn-on impulses, as a pressure differential adjustment means, as well as an overload protection valve for the test specimen and for the piston cylinder 30. Other advantages of the valve according to the invention are seen in that it has a high response sensitivity in combination with a large adjustment range of the differential pressure, such range starting substantially at zero. The response differential pressure may be predetermined and adjusted by the pressure medium supplied through the conduit 13 to the face 12 of the bearing shaft 3' and/or by the spring 6, 6' or 6" as described above.

Although the invention has been described with reference to specific example embodiments, it is to be understood, tha it is intended to cover all modification and equivalents within the scope of the appended claims.

What is claimed is:

1. A hydraulic circuit arrangement for limiting a differential pressure, comprising cylinder means and a double acting piston means operatively arranged in said cylinder means forming two cylinder chambers one on each side of said piston means, first source means for effecting a differential pressure across said double acting piston means, a casing means, cavity means in said valve casing means, valve plug means in said cavity means, first and second pressure media port means in said valve casing means and communicating with said cavity means and said two cylinder chambers for subjecting said valve plug means to a first pressure on one side thereof and to a second pressure on the opposite side to thereby establish said differential pressure, bearing bore means arranged in axial alignment in said valve casing means, valve seat means located in said valve casing means intermediate said bearing bore means, said pressure media port means being located on opposite sides of said valve seat means for admitting pressure media into said cavity means which establish said differential pressure across said valve seat means, said valve plug means being operatively arranged in said valve casing means for cooperation with said valve seat means, said valve plug means comprising a valve closure body having substantially the same effective surface areas on both sides of said valve seat means and two bearing shafts extending from two opposite sides of said valve closure body, said two bearing shafts having a common longitudinal axis, said bearing shafts being axially slidable in said bearing bore means, substantially without being exposed to the effect of said differential pressure, one of said bearing shafts (3') being arranged opposite of said valve seat means (5) and having axially outwardly facing control surface means (12), said arrangement further comprising second source means including adjustable fluid control pressure applying means (13) operatively arranged to fluid bias said one control surface means (12) of said one bearing shaft (3') toward the valve seat means, whereby said valve closure body (2) is exposable to said differential pressure through said pressure media port means and to said control pressure through said control pressure applying means and through said one bearing shaft for limiting the build-up of a differential pressure in one flow direction relative to said valve seat means and for permitting the build-up of a differential pressure in the opposite flow direction.

2. The arrangement of claim 1, further comprising hydrostatic bearing means for said bearing shafts, said hydrostatic bearing means being arranged for utilizing pressure medium in said cavity means for bearing purposes.

3. The arrangement of claim 1, wherein said bearing shaft means comprise different diameters.

4. The arrangement of claim 1, wherein said valve closure body has a first portion with a conical surface area facing said valve seat, and a second portion with a curved surface area facing away from said valve seat, said first portion having a small diameter and a large diameter, said valve seat means having a diameter intermediate said small and large diameters whereby said conical surface area extends on both sides of the valve seat.

5. The arrangement of claim 1, further comprising closure spring means operatively arranged to normally bias said valve closure body against said valve seat means.

6. The arrangement of claim 5, wherein said closure spring means are arranged between said valve closure body and said valve casing means.

7. The arrangement of claim 5, wherein said closure spring means are arranged between said valve casing means and said axially outwardly facing surface means of the respective bearing shaft.

8. The arrangement of claim 5, further comprising means for adjusting the biasing of said closure spring means for changing the pressure which normally keeps the valve closure body in the valve closing position.

9. The arrangement of claim 1, wherein said cavity means comprise a first portion of smaller diameter and a second portion of larger diameter and a shoulder between said first and second cavity portions, said shoulder forming said valve seat, said valve plug means having a conical end facing into said smaller diameter portion of said cavity means, and a curved surface end facing into said larger diameter portion of said cavity means.

10. A hydraulic circuit arrangement for limiting a differential pressure, comprising cylinder means and double acting piston means operatively arranged in said cylinder means forming two cylinder chambers one on each side of said piston means, first source means for effecting a differential pressure across said double acting piston means, first differential pressure limiting valve means, first conduit means operatively connecting said first valve means in parallel to said two cylinder chambers, second differential pressure limiting valve means, second conduit means operatively connecting the second valve means in parallel to said first valve means in such a manner that said first valve means provides for differential pressure limitation between said cylinder chambers in one direction, whereas said second valve means provides for differential pressure limitation between said cylinder chambers in the opposite direction, wherein each of said first and second differential pressure limiting valve means comprise valve casing means, cavity means in said casing means, valve plug means in said cavity means, first and second pressure media port means in said valve casing means and communicating with said cavity means for subjecting said valve plug means to a first pressure on one side thereof and to a second pressure on the opposite side to thereby establish said differential pressure, bearing bore means arranged in axial alignment in said valve casing means, valve seat means located in said valve casing means intermediate said bearing bore means, said valve plug means being operatively arranged in each of said valve casing means for cooperation with said valve seat means, said valve plug means comprising a valve closure body and two bearing shafts extending from two opposite sides of said valve closure body, each valve closure body having substantially the same effective surface areas on both sides of the respective valve seat means, said two bearing shafts having a common longitudinal axis, said bearing shafts being axially slidable in said bearing bore means without being exposed to said differential pressure, one of said bearing shafts (3') of each valve plug means being arranged opposite said valve seat means (5) and having axially outwardly facing control surface means, said arrangement further comprising second source means including adjustable fluid control pressure applying means operatively arranged to fluid bias said control surface means (12) of said one bearing shaft (3') of each valve plug means toward the respective valve seat means, said pressure media port means being located on opposite sides of said valve means for admitting pressure media into said cavity means which establish said differential pressure across said valve seat means, whereby said valve closure bodies are exposable to said differential pressure through the respective pressure media port means and to said control pressure through said control pressure applying means and through the respective one bearing shaft for avoiding excess differential pressure build-up in both flow directions.

11. The hydraulic circuit arrangement of claim 10, further comprising adjustable biasing spring means operatively arranged in each of said first and second differential pressure limiting valve means for adjusting the closing force for the respective valve plug means.

* * * * *

UNITED STATES PATENT OFFICE
CERTIFICATE OF CORRECTION

Patent No. 4,266,467            Dated May 12, 1981

Inventor(s) Guenter Keller et al

It is certified that error appears in the above-identified patent and that said Letters Patent are hereby corrected as shown below:

Column 5, line 13,     "a differential pressure limiting valve comprising valve" should be inserted before "casing"; "a" should be deleted before "casing".

in claim 10, column 7, line 8, before "means" insert --seat--.

Signed and Sealed this

First Day of June 1982

[SEAL]

Attest:

GERALD J. MOSSINGHOFF

Attesting Officer     Commissioner of Patents and Trademarks